United States Patent [19]

DeVries

[11] Patent Number: 4,509,532

[45] Date of Patent: Apr. 9, 1985

[54] CARDIOPLEGIA TEMPERATURE INDICATOR

[75] Inventor: James H. DeVries, Grand Rapids, Mich.

[73] Assignee: DLP, Inc., Grand Rapids, Mich.

[21] Appl. No.: 403,124

[22] Filed: Jul. 29, 1982

[51] Int. Cl.³ .............................................. A61B 5/00
[52] U.S. Cl. .................................... 128/736; 374/163
[58] Field of Search ......... 128/736; 374/162, 163-164

[56] References Cited

U.S. PATENT DOCUMENTS

| | | | |
|---|---|---|---|
| 2,321,846 | 6/1943 | Obermaier | 374/163 X |
| 2,445,539 | 7/1948 | Singer | 128/736 |
| 3,697,297 | 10/1972 | Churchill et al. | 106/131 |
| 3,720,623 | 3/1973 | Cartmell et al. | 428/402.2 |
| 3,877,411 | 4/1975 | MacDonald | 374/162 X |
| 3,920,574 | 11/1975 | Brown, Jr. et al. | 428/1 |
| 3,955,420 | 11/1976 | Parker | 374/162 |
| 4,083,364 | 4/1978 | Kelly et al. | 128/736 |
| 4,166,451 | 9/1979 | Salera | 128/736 |
| 4,302,971 | 12/1981 | Luk | 128/736 X |

FOREIGN PATENT DOCUMENTS 2518694  11/1976  Fed. Rep. of Germany ...... 128/736

Primary Examiner—Lee S. Cohen
Assistant Examiner—Angela D. Sykes
Attorney, Agent, or Firm—Barnes, Kisselle, Raisch, Choate, Whittemore & Hulbert

[57] ABSTRACT

For use in monitoring the temperature of a heart during open heart surgery involving a cardioplegia system, the invention comprises a housing and mount for a temperature responsive liquid crystal chip or small panel which provides a visual temperature reading in various selected ranges. The housing includes an insulating shell enclosing a heat sink sheet associated with a highly conductive mounting pin which penetrates the wall of the heart and conducts the heart temperature to the heat sink underlying the liquid crystal panel.

11 Claims, 6 Drawing Figures

CARDIOPLEGIA TEMPERATURE INDICATOR

FIELD OF INVENTION

The monitoring of the temperature of the heart during cardiopulmonary by-pass surgery.

BACKGROUND OF THE INVENTION

One of the recent advances in cardiopulmonary by-pass surgery has been the introduction of a technique called cardioplegia administration. A very cold solution, typically in the range of 4° C. is delivered under controlled conditions to the coronary arteries via the aortic root. The solution stops the heart through chemical action and also cools the heart to 10°–14° C. to minimize deterioration of the heart muscle during the operation. As the surgery progresses, it may become necessary to administer an additional amount of cardioplegia solution to again cool the heart and in some instances there is a continuous administration of the cardioplegia solution.

In order to determine if the heart has been adequately protected by cooling, it is beneficial to monitor the temperature at various sites on the heart itself. Since the surface temperature may not be a true indicator of the protection of the heart, it is important to monitor the inner temperature of the heart muscle itself rather than the surface temperature.

Existing devices are electronic in nature. Typical devices utilize a probe consisting of a thermocouple hypodermic needle with a cable running out of the surgical field to an amplified and display system. Typically the probe is quite fragile and must be resterilized prior to each use, with a limited number of uses.

The present invention contemplates a temperature indicator which is self-contained and mountable directly on the heart organ in a position to be readily monitored by the attending surgeon. The device eliminates the need for any electrical connections and the attendant risk involved with such connections. The indicator is relatively inexpensive and thus can be furnished in sterile condition and disposable so that sterilization is not needed. It can also be utilized with a luer fitting to monitor temperatures in the cardioplegia perfusion circuit.

Other objects and features of the invention will be evident in the following description and claims in which the invention is described together with details to enable persons skilled in the art to practice the inventon, all in connection with the best mode presently contemplated for the invention.

BRIEF DESCRIPTION OF THE DRAWINGS

Drawings accompany the disclosure and the various views thereof may be briefly described as.

DETAILED DESCRIPTION OF THE INVENTION AND THE MANNER AND PROCESS OF USING THE SAME

WITH REFERENCE TO THE DRAWINGS, and in general principle, the device utilizes temperature responsive liquid crystal formulations which provide a temperature responsive display. The minute capsules when placed in a heat-conductive relation with a heat source together with an associated thermal gradient pattern to be displayed exhibit an iridescence indication of a certain temperature range, which range varies according to the types and mixtures of mesomorphic materials. Reference is made to the following United States patents for detailed disclosures on heat responsive visual displays:

3,697,297 Oct. 10, 1972 Churchill et al;
3,720,623 Mar. 3, 1973 Cartmell et al;
3,920,574 Nov. 18, 1975 Brown et al.

The visual display materials are manufactured by American Thermometer Co., Inc. of Dayton, Ohio.

Figure 1:
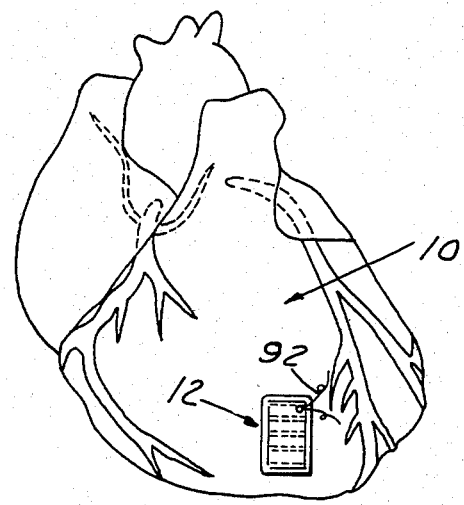
FIG. 1, a view of the exposed heart organ with the temperature indicator in place.

In FIG. 1, the heart organ is shown as it becomes exposed in open heart surgery. It is cooled by a cardioplegia system wherein blood is reduced in temperature and passed through the heart, sometimes with a suitable medication, to minimize deterioration of the heart muscle during the time that it's not functioning normally. Since the surgery may require a rather long period of time, an initial cooling is usually not sufficient and either a batch system of cardioplegia is used, that is, intermittent cooling, or a continuous system is used. In either case, it is desirable for the attending surgeon to know whether additional cooling of the heart is required. The present invention is directed to a device which provides easy monitoring of the heart temperature so that instructions may be given for additional cooling when required.

Figure 2:
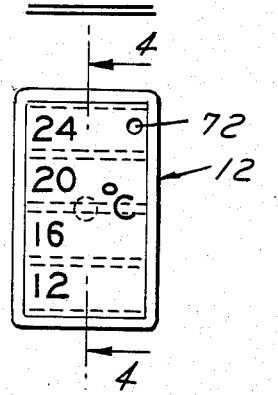
FIG. 2, a face view of the indicator.

In FIG. 2, a face display of a heart monitor 12 is shown with four bars which indicate temperature in centigrade ranges. In practice, the digits 12, 16, 20 and 24 could indicate ranges from 10° to 14° C., 14° to 18° C., 18°–22° C., and 22°–26° C. Each bar is labeled with the midrange value. The display device can have the crystals arranged either in the form of numbers which become visible in response to a heat range or in enumerated bars which will indicate by a change of color the proper range reading.

Figure 3:
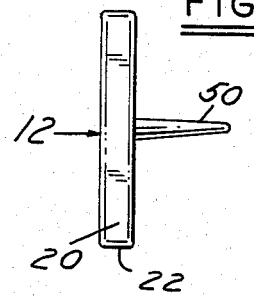
FIG. 3, a side view of the indicator.
Figure 4:
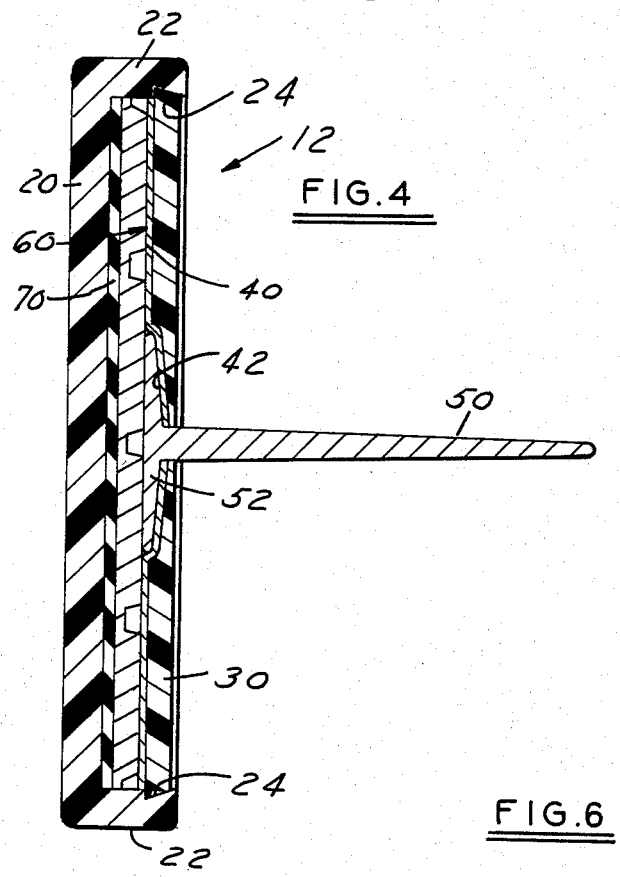
FIG. 4, an enlarged sectional view of the indicator taken on line 4—4 of FIG. 2.

In FIGS. 3 and 4, a side view of the monitor 12 and a sectional view are shown respectively. With particular reference to FIG. 4, a housing is formed of two parts; a rectangular cover 20 formed of a clear plastic with a continuous side flange 22 having a re-entrant groove 24 adjacent the edge of the side flange. The base plate or closing panel 30 forms the back cover and has an edge configuration which snaps into the groove 24. Each of these housing units are formed of a material which has a low heat transfer characteristic to minimize the external effect on the reading.

A heat sink plate 40 is preferably formed of a material with a high heat transfer coefficient such as aluminum or copper. The thermal mass of the heat sink should be kept small to optimize the response time of the device. In general, the thickness of this heat sink plate, which extends to the four sides of the cover in a rectangular shape, should be less than 0.010" with the preferred thickness being about 0.003".

The heat sink and heat transfer plate 40 has a small depression 42 centrally thereof and a perforation centrally of the depression. The back of the heat sink is coated with a permanent pressure sensitive adhesive (not shown) to cause it to adhere to the inner surface of the base 30.

A pin 50 with a flat head portion 52 is positioned so that the head 52 lies in the depression 42 and the shank of the pin passes outwardly of the base plate 30. The pin has a length to pierce the wall of the heart and be exposed to the interior of the heat chamber. In the preferred embodiment, this pin is made of sterling silver of less than 0.060" in diameter and preferably in a range of 0.025 to 0.035". Alternatively, the pin may be made of aluminum and coated with a 1 to 2 mil coating of biocompatible plastic.

The indicator panel 60 consists of a thin chip containing the liquid crystals previously referred to and compounded to change color at a predetermined temperature or temperature range as previously described. The head 52 of pin 50 is attached to the indicator chip 60 with a small amount of adhesive.

Between the chip 60 and the inside of the clear plastic cover, a layer of transparent adhesive 70 is provided to stabilize the location of the chip and pin. This layer of adhesive, such as a transparent silicone rubber, serves as a portion of the light path required to read the indicator and eliminates refractive problems due to entrapped air.

A suture hole 72 (FIG. 2) near the periphery of the device allows it to be anchored to the heart with a suitable suture filament.

Figure 5:
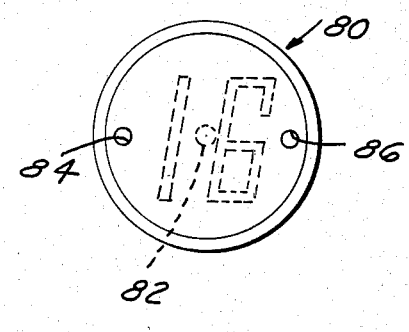
FIG. 5, a modified configuration for the indicator.

In FIG. 5, a circular display unit 80 is shown with a pin 82, a suture hole 84, and a hole 86 for a Harker Tie. This unit has digital display numerals which will appear seriatium with temperature changes.

Figure 6:
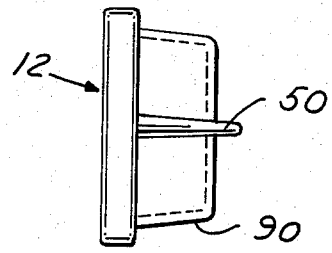
FIG. 6, an illustration of the device used with a luer fitting.

In FIG. 6, the device is shown attached to a luer fitting 90 which can be placed in a perfusion circuit to monitor temperatures in a cardioplegia system.

What is claimed is:

1. A visual temperature monitor for use in open heart surgery and adapted to be used in connection with cardioplegia systems for reducing the temperature of the heart which comprises:
   (a) a double walled housing providing between the walls a relatively thin chamber, one of the walls of said housing being transparent,
   (b) a thin temperature sensitive liquid crystal chip disposed in said chamber and exposed to said transparent wall,
   (c) a heat sink plate lying against said chip on a side of said chip opposite said transparent wall, and
   (d) a heat transfer pin having a tapering shank projecting from said housing for removable insertion into heart tissue and having an end within said housing in heat conductive contact with said heat sink plate.

2. A temperature monitor as defined in claim 1 in which said housing comprises a transparent panel having a side flange, and a closing panel having edges confined within said side flange.

3. A temperature monitor as defined in claim 2 in which a layer of transparent material is lodged between said liquid crystal chip and said transparent panel.

4. A temperature monitor as defined in claim 2 in which the edges of said closing panel are lodged in a reentrant groove on said side flange.

5. A temperature monitor as defined in claim 1 in which said heat sink plate is formed with a depression and said pin has an enlarged head at said end lodged in said depression between said plate and said chip, the shank of said pin projecting through said heat sink plate and through a wall of said housing.

6. The monitor set forth in claim 5 wherein said housing is of generally flat planar construction, with said shank projecting orthogonally of the plane of said housing, and with said transparent wall being oriented oppositely of said shank.

7. A disposable monitor for visual indication of heart temperature during heart surgery accompanied by cardioplegia administration, said monitor comprising:
   a housing having a transparent wall,
   temperature sensitive display means disposed within said housing so as to be visible through said transparent housing wall, and
   a pin of heat conductive construction having a tapering shank projecting from said housing for removable piercing insertion into heart tissue and a head disposed within said housing in heat transfer communication with said temperature sensitive display means.

8. The monitor set forth in claim 7 wherein said housing is of generally flat planar construction, with said shank projecting orthogonally of the plane of said housing, and with said transparent wall being oriented oppositely of said shank.

9. The monitor set forth in claim 7 further comprising means on said housing for removably suturing said housing to a heart with said shank inserted into heart tissue and said transparent wall facing outwardly of the heart.

10. A disposable monitor for visual indication of heart temperature during heart surgery accompanied by cardioplegia administration, said monitor comprising
    a generally flat housing of plastic construction having a transparent wall facing orthogonally of said housing,
    temperature sensitive digital liquid crystal display means disposed within said housing so as to be visible through said transparent wall,
    a pin of heat conductive construction having a shank which projects and tapers narrowingly orthogonally of said housing oppositely of said transparent wall for piercing insertion into heart tissue, one end of said pin being disposed within said housing, and
    means within said housing coupling said one end of said pin in heat transfer contact with said temperature sensitive liquid crystal display means.

11. The monitor set forth in claim 10 further comprising means on said housing for removably suturing said housing to a heart with said shank inserted into heart tissue and said transparent wall facing outwardly of the heart.

* * * * *